United States Patent
Xu et al.

(10) Patent No.: US 12,392,144 B2
(45) Date of Patent: Aug. 19, 2025

(54) MULTI-LAYER FOAMED FLOORBOARD AND PREPARATION METHOD THEREOF

(71) Applicant: JIANGSU BBL HOME TECHNOLOGY CO., LTD., Changzhou (CN)

(72) Inventors: Hongkai Xu, Changzhou (CN); Yanhui Li, Changzhou (CN); Junxiang Dong, Changzhou (CN)

(73) Assignee: JIANGSU BBL HOME TECHNOLOGY CO., LTD., Changzhou (CN)

( * ) Notice: Subject to any disclaimer, the term of this patent is extended or adjusted under 35 U.S.C. 154(b) by 0 days.

(21) Appl. No.: 19/081,909

(22) Filed: Mar. 17, 2025

(65) Prior Publication Data

US 2025/0215706 A1    Jul. 3, 2025

Related U.S. Application Data

(63) Continuation of application No. PCT/CN2025/080805, filed on Mar. 5, 2025.

(30) Foreign Application Priority Data

Dec. 30, 2024 (CN) .......................... 202411965410.X

(51) Int. Cl.
| | | |
|---|---|---|
| *E04F 15/10* | (2006.01) |
| *B29C 48/00* | (2019.01) |
| *B29C 48/07* | (2019.01) |
| *B29C 48/21* | (2019.01) |
| *B29C 48/88* | (2019.01) |
| *B29K 27/06* | (2006.01) |
| *B29K 105/00* | (2006.01) |
| *B29K 105/04* | (2006.01) |
| *B29K 507/04* | (2006.01) |
| *B29K 509/00* | (2006.01) |
| *B29L 31/30* | (2006.01) |

(52) U.S. Cl.
CPC .......... *E04F 15/107* (2013.01); *B29C 48/022* (2019.02); *B29C 48/07* (2019.02); *B29C 48/21* (2019.02); *B29C 48/9135* (2019.02); *E04F 15/105* (2013.01); *B29K 2027/06* (2013.01); *B29K 2105/0044* (2013.01); *B29K 2105/04* (2013.01); *B29K 2507/04* (2013.01); *B29K 2509/00* (2013.01); *B29L 2031/3017* (2013.01)

(58) Field of Classification Search
None
See application file for complete search history.

(56) References Cited

FOREIGN PATENT DOCUMENTS

| | | | |
|---|---|---|---|
| CN | 110626027 B | | 3/2021 |
| CN | 114932732 A | | 8/2022 |
| CN | 115625950 A | * | 1/2023 |
| WO | WO 2020028633 A1 | * | 2/2020 |

* cited by examiner

*Primary Examiner* — Samir Shah

(57) ABSTRACT

A multi-layer foamed floorboard and its preparation method are provided. The multi-layer foamed floorboard includes a surface layer and a core layer with a surface layer-core layer-surface layer structure. Raw materials of the surface layer include a first polyvinyl chloride (PVC) resin powder, a first calcium carbonate powder, a recycled material, a first calcium-zinc stabilizer, a first foaming aid, a toughening agent, a first internal lubricant, a first external lubricant and carbon black. Raw materials of the core layer include a second PVC resin powder, a second calcium carbonate powder, a foaming recycled material, a second calcium-zinc stabilizer, a second foaming aid, a foaming regulator, a yellow foaming agent, a white foaming agent, a second internal lubricant and a second external lubricant.

10 Claims, No Drawings ional Patent
MULTI-LAYER FOAMED FLOORBOARD AND PREPARATION METHOD THEREOF

CROSS-REFERENCE TO RELATED APPLICATIONS

This application is a continuation of International Patent Application No. PCT/CN2025/080805, filed on Mar. 5, 2025, which claims the benefit of priority from Chinese Patent Application No. 202411965410.X, filed on Dec. 30, 2024. The content of the aforementioned application, including any intervening amendments thereto, is incorporated herein by reference in its entirety.

TECHNICAL FIELD

This application relates to composite floorboards, and more particularly to a multi-layer foamed floorboard and a preparation method thereof.

BACKGROUND

In recent years, the polyvinyl chloride (PVC) floorboard market has shown a rapid growth trend. The global scale of the PVC floorboard continues to expand, Europe and the United States have become the main consumer market, and China is the production and export country, which has rising exports.

For competition, international brands occupy the high-end market, while Chinese brands have a large amount and low concentration, and only some companies have risen to prominence through quality and research and development. The development of the floorboard tends to directions of environmental protection, multi-functional and beauty. However, the market has problems on inferior products and is affected by fluctuations of prices of raw materials. Overall, the PVC floorboard have prospects and challenges.

The current floorboard market has new requirements for products. The floorboard with good toughness, good stability and lightweight has become the focus in the market, where good toughness can resist impact and pressure, good stability can adapt to a variety of environments and avoid deformation, and light floorboard is more convenient for transportation and installation. Floorboards, which meet characteristics above, are urgently needed in the market, and will also lead the development direction of the floorboard industry.

However, there are still shortcomings in traditional PVC floorboard in meeting the above characteristics. For example, toughness and stability are difficult to balance, especially problems on warping and shrinkage in the high temperature environments are easy to appear. In addition, compared with conventional stone plastic composite (SPC) floorboard, how to maintain and improve mechanical properties, such as static bending intensity and elasticity modulus, based on reduction of weight is still problems that need to be solved in the prior art.

SUMMARY

In order to solve the shortcomings of the floorboard in weight, toughness and high temperature stability in the prior art, this application provides a multi-layer foamed polyvinyl chloride (PVC) floorboard and a preparation method thereof.

In other to arrive at the above objectives, technical solutions of this application are described as follows.

In a first aspect, this application provides a multi-layer foamed floorboard, comprising:
  a surface layer; and
  a core layer;
  wherein raw materials of the surface layer comprise:
    40-60 parts by weight of a first polyvinyl chloride (PVC) resin powder;
    80-110 parts by weight of a first calcium carbonate powder;
    35-60 parts by weight of a recycled material;
    2-4 parts by weight of a first calcium-zinc stabilizer;
    2-4 parts by weight of a first foaming aid;
    2-4 parts by weight of a toughening agent;
    0.5-3 parts by weight of a first internal lubricant;
    0.5-3 parts by weight of a first external lubricant; and
    0.1-0.5 parts by weight of carbon black.

In an embodiment, the raw materials of the surface layer comprise:
  50 parts by weight of the first PVC resin powder;
  100 parts by weight of the first calcium carbonate powder;
  40 parts by weight of the recycled material;
  3.6 parts by weight of the first calcium-zinc stabilizer;
  3 parts by weight of the first foaming aid;
  2.2 parts by weight of the toughening agent;
  1 part by weight of the first internal lubricant;
  0.8 part by weight of the first external lubricant; and
  0.3 part by weight of carbon black.

In an embodiment, the first PVC resin powder is SG5 PVC powder.

In an embodiment, the first calcium carbonate powder is 400-mesh calcium carbonate.

In an embodiment, the first foaming aid is acrylic copolymer (ACR).

In an embodiment, the toughening agent is a chlorinated polyvinyl chloride (CPVC) resin particle.

In an embodiment, raw materials of the CPVC resin particle comprise:
  100 parts by weight of CPVC with 67% chlorine content;
  4 parts by weight of chlorinated polyethylene (CPE) with 35% chlorine content;
  10 parts by weight of SG5 PVC powder;
  10 parts by weight of a methyl methacrylate-butadiene-styrene (MBS) resin;
  5 parts by weight of the first calcium-zinc stabilizer; and
  0.4 part by weight of a polyethylene (PE) wax.

In an embodiment, raw materials of the core layer comprise:
  40-60 parts by weight of a second PVC resin powder;
  80-100 parts by weight of a second calcium carbonate powder;
  40-60 parts by weight of a foaming recycled material;
  3-5 parts by weight of a second calcium-zinc stabilizer;
  1-3 parts by weight of a second foaming aid;
  5-10 parts by weight of a foaming regulator;
  0.1-0.5 part by weight of a yellow foaming agent;
  0.1-0.3 part by weight of a white foaming agent;
  0.5-3 parts by weight of a second internal lubricant; and
  0.5-3 parts by weight of a second external lubricant.

In an embodiment, the raw materials of the core layer comprise:
  50 parts by weight of the second PVC resin powder;
  85 parts by weight of the second calcium carbonate powder;
  40 parts by weight of the foaming recycled material;
  4 parts by weight of the second calcium-zinc stabilizer;
  2.5 parts by weight of the second foaming aid;
  6 parts by weight of the foaming regulator;

0.25 part by weight of the yellow foaming agent;
0.1 part by weight of the white foaming agent;
0.95 part by weight of the second internal lubricant; and
0.8 part by weight of the second external lubricant.

In an embodiment, the second PVC resin powder is SG8 PVC powder.

In an embodiment, the second calcium carbonate powder is 1250-mesh calcium carbonate.

In an embodiment, the second foaming aid is acrylic copolymer (ACR).

In an embodiment, the foaming regulator is an acrylic-based PVC processing aid with a molecular weight of 5,000,000-6,500,000 Dalton (Da).

In an embodiment, raw materials of the foaming regulator comprise methacrylate, butyl acrylate, 4-fluoro-2-methyl-1-vinyl-benzene, an emulsifier and an initiator; a weight ratio of methacrylate to butyl acrylate is 1:1.5-3; and a weight ratio of methacrylate to 4-fluoro-2-methyl-1-vinyl-benzene is 1:0.1-0.3.

In an embodiment, the multi-layer foamed floorboard has a surface layer-core layer-surface layer structure.

In an embodiment, a thickness of the surface layer is 0.8-1.2 mm, and a thickness of the core layer is 2.5-12.5 mm.

In a second aspect, this application provides a method for preparing the multi-layer foamed floorboard, comprising:
 (S1) stirring the raw materials of the surface layer followed by heating to 110-120° C., and stirring raw materials of the core layer followed by heating to 110-120° C.;
 (S2) cooling the raw materials of the surface layer and the raw materials of the core layer, followed by transferring to an extruding machine;
 (S3) injecting the raw materials of the core layer to a mold through a merging core, and injecting the raw materials of the surface layer to the mold through the merging core and a flow channel; and forming, through a distributor, a crude plate with a surface layer-core layer-surface layer structure; and
 (S4) extruding the crude plate through the mold, followed by cooling, laminating, trimming and cutting to obtain the multi-layer foamed floorboard.

In an embodiment, a temperature of the merging core is 170-200° C.; and/or
a temperature of the flow channel is 170-180° C.

In an embodiment, in step (S4), the mold comprises a cooling roller, a first mold roller, a second mold roller, a third mold roller, a fourth mold roller and a fifth mold roller; a rotating speed of the cooling roller is 200-230 R/min; a rotating speed of the first mold roller is 180-200 R/min; a rotating speed of the second mold roller is 180-200 R/min; a rotating speed of the third mold roller is 160-180 R/min; a rotating speed of the fourth mold roller is 160-180 R/min; and a rotating speed of the fifth mold roller is 220-240 R/min.

In an embodiment, the crude plate is extruded through a step of:
 successively processing the crude plate through the cooling roller, the first mold roller, the second mold roller, the third mold roller, the fourth mold roller and the fifth mold roller.

In an embodiment, a temperature of the cooling roller is 0-5° C.

Parameters herein are set according to an actual situation to optimize a range, which can better ensure stability of a prepared product.

This application has the following beneficial effects.

(1) This application adopts the toughening agent, which can effectively improve indicators, such as the static bending intensity, the elasticity modulus and displacement, and enhance toughness of materials.

(2) This application adopts the surface layer-core layer-surface layer structure, which can effectively control warping on a back of the product and improve the stability of the floorboard. The formed floorboard of this application can maintain at a temperature of 80° C. for 6 h, and the stability of shrinkage and warping of the formed floorboard is better than that of the cold laminate multi-layer floorboard of the prior art.

(3) This application adopts a core forming technology. Compared with conventional stone plastic composite (SPC) floorboard, a weight of the foamed floorboard reduces by at least 20%, which is more convenient for transportation and installation and maintains higher mechanical properties.

DETAILED DESCRIPTION OF EMBODIMENTS

Experimental methods without indicating specific conditions in the following embodiments are usually in accordance with conventional conditions or conditions suggested by the manufacturer. Various commonly used chemical reagents used in the embodiments are commercially available.

Unless otherwise defined, technical terms used herein have the same meaning as commonly understood by those of ordinary skill in the art. The technical terms used herein are only illustrative, and are not intended to limit this application.

The terms "comprising" and "including" and any variation thereof, are intended to cover non-exclusive inclusion. For example, process, method, equipment, product, or device including a series of steps are limited to listed steps or modules, but optionally include steps that not listed or other steps inherent to those process, method, product, or device.

The present disclosure provides a multi-layer foamed floorboard including a surface layer and a core layer.

A formula of the surface layer and a preparation thereof are described as follows.

Raw materials of the surface layer include 40-60 parts by weight of a first polyvinyl chloride (PVC) resin powder, 80-100 parts by weight of a first calcium carbonate powder, 40-60 parts by weight of a recycled material, 2-4 parts by weight of a first calcium-zinc stabilizer, 2-4 parts by weight of a first foaming aid, 2-4 parts by weight of a toughening agent, 0.5-3 parts by weight of a first internal lubricant, 0.5-3 parts by weight of a first external lubricant and 0.1-0.5 parts by weight of carbon black.

In an embodiment, the first PVC resin powder is SG5 PVC powder, which is one of commonly used types of PVC resins.

In an embodiment, the first calcium carbonate powder is 400-mesh calcium carbonate, because particles which are too thick are easy to be burnt, while particles which are too fine have increasing cost and easily lead to crisp products.

In an embodiment, the recycled material is a crushed PVC floorboard. From the perspective of environmental protection, it can reduce the waste of resources, reduce carbon emissions and reduce waste pollution. From perspective of economy, it can reduce production costs and improve resource utilization.

In an embodiment, the first calcium-zinc stabilizer is a PVC non-toxic environmentally friendly calcium-zinc stabilizer including a first zinc soap, a first calcium soap, a first auxiliary stabilizer, a first lubricant, which has characteristics of non-toxic, high efficiency, good stability, fine bubble hole, good demold performance, excellent processing performance, long production cycle.

In an embodiment, the first foaming aid is acrylic copolymer (ACR). ACR is copolymerized by methyl methacrylate (MMA) and acrylics, which can promote plasticizing performance of unplasticized polyvinyl chloride (PVCU) and improve liquidity of PVCU.

In an embodiment, the first internal lubricant is G60, mainly including stearic acid.

In an embodiment, the first external lubricant is a polyethylene (PE) wax.

In an embodiment, the toughening agent is a modified chlorinated polyvinyl chloride (CPVC) resin particle, and a preparation formula and method are described as follows.

(a) 100 parts by weight of CPVC with 67% chlorine content, 4 parts by weight of chlorinated polyethylene (CPE) with 35% chlorine content, 10 parts by weight of SG5 PVC powder, 10 parts by weight of methyl methacrylate-butadiene-styrene (MBS) resin, 5 parts by weight of first calcium-zinc stabilizer and 0.4 part by weight of PE wax are successively mixed in a low-speed stirrer, and then are transferred to a high-speed stirrer, followed by heating to 90° C. to obtain a mixture.

In step (a), chlorinated polyethylene (CPE) with 35% chlorine content is configured as a compatibilizer to increase a binding force between CPVC and PVC and improve mechanical properties. MBS resin has solubility parameters similar to PVC, therefore, MBS resin and PVC have good compatibility, which shows that PVC has high shock resistance at room temperature or low temperature.

(b) The mixture is transferred to a conical twin-screw extruder, followed by extrusion at a temperature of 180-200° C., followed by thickness cooling at a machine head and whole cooling to obtain a crude product.

(c) The crude product is subjected to granulation, followed by screening to obtain the modified CPVC resin particle.

In an embodiment, the carbon black is configured for floorboard coloring.

A formula of the core layer and a preparation thereof are described as follows.

Raw materials of the core layer include 40-60 parts by weight of a second PVC resin powder, 80-100 parts by weight of a second calcium carbonate powder, 40-60 parts by weight of a foaming recycled material, 3-5 parts by weight of a second calcium-zinc stabilizer, 1-3 parts by weight of a second foaming aid, 5-10 parts by weight of a foaming regulator, 0.1-0.5 part by weight of a yellow foaming agent, 0.1-0.3 part by weight of a white foaming agent, 0.5-3 parts by weight of a second internal lubricant and 0.5-3 parts by weight of a second external lubricant.

In an embodiment, the second PVC resin powder is a SG8 PVC powder, a polymerization degree of the SG8 PVC powder is 650-740, and a K value of the SG8 PVC powder is 55-59, which is more suitable for foaming.

In an embodiment, the second calcium carbonate powder is 1250-mesh calcium carbonate. When a particle size of the second calcium carbonate powder is matched with the yellow foaming agent and the white foaming agent, the second calcium carbonate powder plays a role of a nucleating agent to promote foaming. The second calcium carbonate powder has a suitable particle size less than or equal to 10 μm and does not agglomerate, which better adsorb a foaming gas to form bubble core, control the number of bubble pores, and make the bubble pores finer. In addition, the second calcium carbonate powder can improve melt performance, because the second calcium carbonate powder has a relatively larger rigidity, which slow down deformation and movement of the melt, so as to inhibit excessive expansion of the bubble hole and control the size of the bubble hole. When the particle size of the second calcium carbonate powder is less than or equal to 10 μm, the second calcium carbonate powder is configured as the nucleating agent to promote foaming. When the particle size of the second calcium carbonate powder is less than 1 μm, self-aggregation may appear to affect the foaming effect. When the particle size of the second calcium carbonate powder is larger than 20 μm, although large particles are not easy to spontaneously agglomerate due to high surface energy, uneven local dispersion caused by mechanical accumulation is easy to appear if a processing shear force is insufficient.

In an embodiment, the foaming recycled material is a crushed PVC floorboard.

In an embodiment, the second calcium-zinc stabilizer is a PVC non-toxic environmentally friendly calcium-zinc stabilizer including a second zinc soap, a second calcium soap, a second auxiliary stabilizer, a second lubricant, which has characteristics of non-toxic, high efficiency, good stability, fine bubble hole, good demold performance, excellent processing performance, long production cycle.

In an embodiment, the second foaming auxiliary agent is ACR. ACR is copolymerized by MMA and acrylics, which can promote plasticizing performance of PVCU and improve liquidity of PVCU.

In an embodiment, the second internal lubricant is G60-type lubricant, mainly including stearic acid. Specifically, the second internal lubricant is dicarboxylate containing fatty alcohols.

In an embodiment, the second external lubricant is a PE wax.

In an embodiment, the foaming regulator is an acrylic-based PVC processing aid, which has basic characteristics of PVC processing aids, and has the only difference on molecular weight from PVC general processing aids. The foaming regulator is the acrylic-based PVC processing aid with a high molecular weight, and its molecular weight is much higher than that of PVC resin (which is generally 50,000-110,000). The molecular weight of the foaming regulator is generally 5,000,000-6,500,000 Dalton (Da), which can better entwine PVC molecules together to form a gel network, so as to improve the strength of the melt, prevent bubble coalescence and gas overflow, and ensure the quality and density of foaming products.

In an embodiment, raw materials of the foaming regulator include methacrylate, butyl acrylate, 4-fluoro-2-methyl-1-vinyl-benzene, an emulsifier and an initiator. A weight ratio of methacrylate to butyl acrylate is 1:1.5-3, and a weight ratio of methacrylate to 4-fluoro-2-methyl-1-vinyl-benzene is 1:0.1-0.3.

In an embodiment, the yellow foaming agent has a gas evolution volume of 220-230 ml/g, a decomposition temperature of 195-205° C. and a volatilization volume of ≤0.2% (110° C. 1H).

In an embodiment, the white foaming agent has a gas evolution volume of 130-140 ml/g, a decomposition temperature of 157-165° C. and a volatilization volume of ≤0.5% (110° C. 1H).

This application adopts a core forming technology. Compared with conventional stone plastic composite (SPC) floorboard, a weight of the foamed floorboard reduces by at least 20%, for example, the foamed floorboard the same thickness of 5 mm is 2 kg less per square meter than the conventional SPC floorboard, which is more convenient for transportation and installation and maintains higher mechanical properties.

The present disclosure provides a method for preparing the multi-layer foamed floorboard through multi-layer coextrusion, and the method is described as follows.

(S100) The raw materials of the surface layer including the first calcium carbonate powder, the first PVC resin powder, a plasticizer, the first calcium-zinc stabilizer, the first internal lubricant and the first external lubricant are stirred, through the high-speed stirrer in a first reactor followed by heating to 110-120° C. The raw materials of the core layer including the second calcium carbonate powder, the second PVC resin powder, the foaming recycled material, the second calcium-zinc stabilizer, the second internal lubricant and the second external lubricant are stirred, through the high-speed stirrer, in a second reactor followed by heating to 110-120° C.

(S200) The raw materials of the surface layer are cooled to 65° C., and then are transferred into a first storage silo. The raw materials of the surface layer in the first storage silo are transferred to a first twin-screw extruder through a spiral feeding system. The raw materials of the core layer are cooled to 65° C., and then are transferred into a second storage silo. The raw materials of the core layer in the second storage silo are transferred to a second twin-screw extruder through the spiral feeding system.

(S300) The surface layer is prepared through the first twin-screw extruder, and the core layer is prepared through the second twin-screw extruder.

Step (S300) is performed through the following steps.

The raw materials of the core layer are injected to a mold through a merging core, and the raw materials of the surface layer are injected to the mold through the merging core and a flow channel. The raw materials of the core layer and the raw materials of the surface layer are distributed through a distributor according to the merging core and the flow channel for recombination to form a crude plate with a surface layer-core layer-surface layer structure.

(S400) The crude plate is extruded through the mold, followed by cooling, laminating, trimming and cutting to obtain the multi-layer foamed floorboard.

Step (S400) is performed through the following steps.

(S410) The first twin-screw extruder and the second twin-screw extruder are examined, and then is heated/pre-cooled.

The step of the first twin-screw extruder and the second twin-screw extruder are examined includes but not limited through a step of:

functions of a power supply system and a cooling water system are ensured to be normal, and installations of the mole, the distributor and a vacuum device are ensured to be proper.

The first twin-screw extruder and the second twin-screw extruder are heated/pre-cooled through the following step.

(S411) A temperature of a die orifice is set to 170-180° C., a temperature of the mold is set to 180-190° C., and a temperature of a side plate is set to 190-210° C. The die orifice, the mold and the side plate are heated for 2 h.

(S412) Temperatures of the first twin-screw extruder and the second twin-screw extruder are set according to a following table, and are allowed to be appropriately adjusted under the conditions that guarantee of stable extrusion. The first twin-screw extruder and the second twin-screw extruder are started to heat for 2.5 h (Note: the number of 7 and 8 of the second twin-screw extruder).

| Number | 1 | 2 | 3 | 4 | 5 | 6 | 7 | 8 |
|---|---|---|---|---|---|---|---|---|
| 92# second twin-screw extruder | 185 | 188 | 185 | 180 | 180 | 175 | 175 | 175 |
| 80# first twin-screw extruder | 195 | 190 | 185 | 180 | 175 | / | 175 | / |

(S413) A temperature of the distributor is set according to a following table, and are allowed to be appropriately adjusted under the conditions that guarantee of stable extrusion. The distributor is started to heat for 0.5 h.

| | Flow channel 1 | Flow channel 2 | Flow channel 3 | Upper layer of the mold | Lower layer of the mold |
|---|---|---|---|---|---|
| Temperature of distributor | 170-180 | 170-180 | 170-180 | 170-180 | 170-180 |

(S414) Temperatures of a first mold roller, a second mold roller, a third mold roller, a fourth mold roller and a fifth mold roller are set, and are allowed to be appropriately adjusted under the conditions that guarantee of stable extrusion, where a first mold roller is set to 190° C., a second mold roller is set to 190° C., a third mold roller is set to 180° C., and the fourth mold roller and the fifth mold roller are cold water roller. The first mold roller, the second mold roller, the third mold roller, the fourth mold roller and the fifth mold roller are started to heat for 1.5 h.

(S415) A cooling roller is set to ensure circulation of cooling water, and a temperature of the cooling water is 15° C.

(S420) The first twin-screw extruder and the second twin-screw extruder are started. A rotating speed of the 80# first twin-screw extruder is set to 200 R/min, and a feeding speed of the 80# first twin-screw extruder is set to 120 R/min. After extrusion of the 80# first twin-screw extruder, a rotating speed of the 92# second twin-screw extruder is set to 200 R/min, and a feeding speed of the 92# second twin-screw extruder is set to 90 R/min. The rotating speed of the 80# first twin-screw extruder, the feeding speed of the 80# first twin-screw extruder, the rotating speed of the 92# second twin-screw extruder and the feeding speed of the 92# second twin-screw extruder are slowly increased, and are increased by 20-40 R/min each time. A stable rotating speed of the 80# first twin-screw extruder, a stable feeding speed of the 80# first twin-screw extruder, a stable rotating speed of the 92# second twin-screw extruder, a stable feeding speed of the 92# second twin-screw extruder and stable currents are set according to a following table, and are allowed to be appropriately adjusted under the conditions that guarantee of stable extrusion (Note: current situation is observed during increase of speeds, and the speeds are increase slowly to avoid the alarm of high current).

|  | Rotating speed (reference) | Feeding speed (reference) | Stable current (reference) |
|---|---|---|---|
| 92# second twin-screw extruder | 300 R/min | 300-310 R/min | 90-100 A |
| 80# first twin-screw extruder | 400 R/min | 180-190 R/min | 100-120 A |

Taking production of 6.5 mm product as an example, rotating speeds of the colling roller, the first mold roller, the second mold roller, the third roller, the fourth mold roller and the fifth mold roller are set as reference.

|  | Cooling roller (0-5° C.) | First mold roller | Second mold roller | Third mold roller | Fourth mold roller | Fifth mold roller |
|---|---|---|---|---|---|---|
| Rotating speed (R/min) | 200-230 | 180-200 | 180-200 | 160-180 | 160-180 | 220-240 |

A traction, a first bracket, a second bracket, a first lamp shade and a second lamp shade are set as reference.

|  | Traction | First bracket | Second bracket | First lamp shade | Second lamp shade |
|---|---|---|---|---|---|
| Rotating speed/Temperature | 310-330 R/min | 250-300 R/min | 250-300 R/min | 100° C. | 100° C. |

(S430) The crude plate is extruded processed as follows. During extrusion of the crude plate, a machine table is moved, the first mold roller is close to the die orifice, and an extrusion plate is prepared to be pulled. After the extrusion plate comes out of the die orifice, it is manually pulled to the cooling roller and is transferred. After flatness of the crude plate and thickness of each layer are adjusted, the first lamp shade is opened, followed by laminating to form a laminated plate. According to a required width of the laminated plate, a gap between rotating blades is adjusted for trimming. After the laminated plate passes through a cooling area, the laminated plate is cut to into the multi-layer foamed floorboard with a required size by a plate shearing machine.

(S440) A heating system, a transmission belt and a cooling system are closed. The first storage silo, the second storage silo, and a roller system are closed. Dust accumulated at an upper end of the second twin-screw extruder is cleaned. Residue materials in the first twin-screw extruder and the second are replaced according to the actual situation.

Examples are set as follows.

Specific formulas of Examples 1-3 are shown in Table 1. The preparation processes of these example are carried out in accordance with specific steps of the method for preparing the multi-layer foamed floorboard.

TABLE 1

Formulas of multi-layer foamed floorboard

|  |  | Example 1 | Example 2 | Example 3 |
|---|---|---|---|---|
| Surface layer | First PVC resin powder | 50 | 45 | 55 |
|  | 400-mesh calcium carbonate | 100 | 110 | 95 |
|  | Recycled material | 40 | 45 | 35 |

TABLE 1-continued

Formulas of multi-layer foamed floorboard

|  |  | Example 1 | Example 2 | Example 3 |
|---|---|---|---|---|
|  | First calcium-zinc stabilizer | 3.6 | 3 | 3.6 |
|  | First foaming aid | 3 | 3 | 3 |
|  | First internal lubricant | 1 | 1 | 1 |
|  | First external lubricant | 0.8 | 0.8 | 0.8 |
|  | Toughening agent | 2.2 | 2.2 | 2.2 |
|  | Carbon black | 0.3 | 0.3 | 0.3 |
| Core layer | Second PVC resin powder | 50 | 45 | 55 |
|  | 1250-mesh calcium carbonate | 85 | 80 | 80 |
|  | Foaming recycled material | 40 | 40 | 35 |
|  | Second calcium-zinc stabilizer | 4 | 3.5 | 4 |
|  | Second foaming aid | 2.5 | 2.5 | 2.5 |
|  | Second internal lubricant | 0.95 | 0.95 | 0.95 |
|  | Second external lubricant | 0.8 | 0.8 | 0.8 |
|  | Foaming regulator | 6 | 6 | 6 |
|  | Yellow foaming agent | 0.25 | 0.25 | 0.25 |
|  | White foaming agent | 0.1 | 0.1 | 0.1 |

Comparative Example 1

A conventional floorboard was prepared herein, its formula and preparation method are described as follows.

Raw materials of the conventional floorboard included 75 parts by weight of a third PVC resin powder, 250 parts by weight of a third calcium carbonate powder, 7 parts by weight of a third calcium-zinc stabilizer, 0.7 part by weight of a third external lubricant and 1.7 parts by weight of a third internal lubricant.

In an embodiment, the third PVC resin powder was the SG5 PVC powder.

In an embodiment, the third calcium carbonate powder was 400-mesh calcium carbonate, because particles which were too thick were easy to be burnt, while particles which were too fine had increasing cost and easily led to crisp products.

In an embodiment, the third calcium-zinc stabilizer was a calcium-zinc stabilizer was a PVC non-toxic environmentally friendly calcium-zinc stabilizer.

In an embodiment, the third internal lubricant was stearic acid.

In an embodiment, the third external lubricant was PE wax.

A method for preparing the conventional floorboard was described as follows.

(S1) 400-mesh calcium carbonate, the third PVC resin powder and part of a recycled material were added into the high-speed stirrer, and then a toughening agent, the third calcium-zinc stabilizer, the third external lubricant and the third internal lubricant were added to heat to 110-120° C., followed by cooling to obtain a mixed material.

(S2) The mixed material was cooled to 65° C. and then was placed in a storage silo. The mixed material in the storage silo was transferred into a conical twin-screw extruder.

(S3) A temperature of the storage silo was controlled to 160-180° C., a temperature of a mold was controlled to 200-220° C. and a temperature of a die orifice was controlled to 100-140° C. The mixed material was extruded and then formed in the mold to obtained a crude floorboard. A thickness of the crude floorboard was adjusted and shaped by a first roller and a second roller, a color film and a wear-resistant layer were applied by a third roller, and a grain of the crude floorboard was pressed by a fourth roller and a fifth roller, followed by cooling and cutting to obtain the conventional floorboard.

Comparative Example 2

A conventional cold laminate multi-layer floorboard was prepared herein, its formula and preparation method are described as follows.

Raw materials of the conventional cold laminate multi-layer floorboard included 400 parts by weight of a fourth PVC resin powder, 1700 parts by weight of a fourth calcium carbonate powder, 150 parts by weight of dioctyl terephthalate, 7 parts by weight of a stabilizer and 3 parts by weight of carbon black.

In an embodiment, the fourth PVC resin powder was the SG5 PVC powder.

In an embodiment, the fourth calcium carbonate powder was 400-mesh calcium carbonate.

In an embodiment, the stabilizer was a calcium-zinc stabilizer.

A method for preparing the conventional cold laminate multi-layer floorboard was described as follows.

(S1) 400-mesh calcium carbonate, the fourth PVC resin powder, the stabilizer, the carbon black and the dioctyl terephthalate were added into an internal mixer for internal mixing to obtain a mixed material.

(S2) The mixed material was subjected to open milling, followed by calendaring to obtain a luxury vinyl tile (LVT) layer.

(S3) A wear-resistant layer, a color film and the LVT layer were subjected to thermal lamination to obtain a first semi-finished product.

(S4) The first semi-finished product was attached with a wood-plastic composite which was commercially available by glue to obtain a second semi-finished product.

(S5) The second semi-finished product was attached with another LVT layer to obtain the conventional cold laminate multi-layer floorboard.

Test Example 1

Physical property tests of floorboards prepared in Examples 1-3 and Comparative examples 1-2 were tested, and results were shown in Table 2.

TABLE 2

Comparison of physical properties

| Time | Example 1 | Example 2 | Example 3 | Comparative example 1 | Comparative example 2 |
|---|---|---|---|---|---|
| Density/g/cm$^3$ | 1.45 | 1.5 | 1.43 | 2.0 | 1.4 |
| Static bending intensity/Mpa | 22 | 24 | 19 | 22 | 16.0 |
| Elasticity modulus/Mpa | 2820 | 3000 | 3400 | 5200 | 1130 |
| Displacement/mm | 15.5 | 14.2 | 17.1 | 4.2 | 20.3 |
| High temperature shrinkage/% | 0.30 | 0.28 | 0.45 | 0.08 | 0.45 |
| High temperature warping/% | −0.65 | −0.55 | −0.95 | 0.2 | −0.2 |
| Residual indentation/% | 2.54 | 2.33 | 3.45 | 2.42 | 4.5 |

As shown in Table 2, physical properties, such as static bending intensity, elasticity modulus and residual indentation, of the multi-layer foamed floorboards in Examples 1-3 are better than that of the conventional cold laminate multi-layer floorboard in Comparative example 2, indicating that formulas of the surface layer and the core layer and the surface layer-core layer-surface layer structure have significant advantages, resulting in better synergistic effect, and showing better comprehensive performance.

Test Example 2

Paving warping of floorboards prepared in Examples 1-3 and Comparative examples 1-2 were compared, and results were shown in Table 3.

TABLE 3

Comparison of paving warping (Unit: mm)

| Time | Example 1 | Example 2 | Example 3 | Comparative example 1 | Comparative example 2 |
|---|---|---|---|---|---|
| Day 1 | 0.00 | 0.05 | 0.05 | 0.00 | 0.05 |
| Day 2 | 0.00 | 0.10 | 0.15 | 0.15 | 0.22 |
| Day 3 | 0.05 | 0.15 | 0.30 | 0.25 | 0.94 |
| Day 4 | 0.05 | 0.15 | 0.45 | 0.30 | 1.12 |
| Day 5 | 0.11 | 0.25 | 0.50 | 0.31 | 1.20 |
| Day 6 | 0.12 | 0.31 | 0.55 | 0.33 | 1.36 |
| Day 7 | 0.16 | 0.41 | 0.60 | 0.35 | 1.42 |

Note:
Comparison of paving warping was tested through placing a floorboard in a constant temperature room for one day with a circulation of 35° C.*12 H and 0° C.*12 H.

As shown in Table 3, during the entire experimental period, paving warping values of the multi-layer foamed floorboards in Examples 1-3 are lower than that of the conventional cold laminate multi-layer floorboard in Comparative example 2 indicating that the multi-layer foamed structure can effectively improve the warping resistance.

In this test example, a paving warping value of the multi-layer foamed floorboard in Example 1 is only 0.16 mm in day 1, which is lower than that of other examples. Because of better formulas of the surface layer and the core layer in Example 1, its formulas of the surface layer and the core layer and the surface layer-core layer-surface layer structure produce unexpected synergies, which can effectively reduce the stress accumulation in the floorboard and make it more stable in environment with temperature difference. In addition, the foamed core layer provides a good buffer function, which reduces impact of thermal expansion of the floorboard.

Described above are only preferred embodiments of the present disclosure, which are not intended to limit the disclosure and shall not be regarded as exclusion of other embodiments. Described above can be used in various other combinations, modifications, and circumstances, and can be modified within the scope of the ideas herein, by means of the above teachings or relevant technology or knowledge. Any modifications and variations made by those of ordinary skill in the art without departing the spirit of the present disclosure, shall fall within the scope of this application defined by the appended claims.

What is claimed is:

1. A multi-layer foamed floorboard, comprising:
   a surface layer; and
   a core layer;
   wherein raw materials of the surface layer comprises:
   40-60 parts by weight of a first polyvinyl chloride (PVC) resin powder;
   80-110 parts by weight of a first calcium carbonate powder;
   35-60 parts by weight of a recycled material;
   2-4 parts by weight of a first calcium-zinc stabilizer;
   2-4 parts by weight of a first foaming aid;
   2-4 parts by weight of a toughening agent;
   0.5-3 parts by weight of a first internal lubricant;
   0.5-3 parts by weight of a first external lubricant; and
   0.1-0.5 parts by weight of carbon black.

2. The multi-layer foamed floorboard of claim 1, wherein the raw materials of the surface layer comprises:
   50 parts by weight of the first PVC resin powder;
   100 parts by weight of the first calcium carbonate powder;
   40 parts by weight of the recycled material;
   3.6 parts by weight of the first calcium-zinc stabilizer;
   3 parts by weight of the first foaming aid;
   2.2 parts by weight of the toughening agent;
   1 part by weight of the first internal lubricant;
   0.8 part by weight of the first external lubricant; and
   0.3 part by weight of carbon black.

3. The multi-layer foamed floorboard of claim 1, wherein
   the first calcium carbonate powder is 400-mesh calcium carbonate; and/or
   the first foaming aid is acrylic copolymer (ACR); and/or
   the toughening agent is a chlorinated polyvinyl chloride (CPVC) resin particle.

4. The multi-layer foamed floorboard of claim 3, wherein raw materials of the CPVC resin particle comprises:
   100 parts by weight of CPVC with 67% chlorine content;
   4 parts by weight of chlorinated polyethylene (CPE) with 35% chlorine content;
   10 parts by weight of the first PVC resin powder;
   10 parts by weight of a methyl methacrylate-butadiene-styrene (MBS) resin;
   5 parts by weight of the first calcium-zinc stabilizer; and
   0.4 part by weight of a polyethylene (PE) wax.

5. The multi-layer foamed floorboard of claim 1, wherein raw materials of the core layer comprises:
   40-60 parts by weight of a second PVC resin powder;
   80-100 parts by weight of a second calcium carbonate powder;
   40-60 parts by weight of a foaming recycled material;
   3-5 parts by weight of a second calcium-zinc stabilizer;
   1-3 parts by weight of a second foaming aid;
   5-10 parts by weight of a foaming regulator;
   0.1-0.5 part by weight of a yellow foaming agent;
   0.1-0.3 part by weight of a white foaming agent;
   0.5-3 parts by weight of a second internal lubricant; and
   0.5-3 parts by weight of a second external lubricant.

6. The multi-layer foamed floorboard of claim 5, wherein the raw materials of the core layer comprises:
   50 parts by weight of the second PVC resin powder;
   85 parts by weight of the second calcium carbonate powder;
   40 parts by weight of the foaming recycled material;
   4 parts by weight of the second calcium-zinc stabilizer;
   2.5 parts by weight of the second foaming aid;
   6 parts by weight of the foaming regulator;
   0.25 part by weight of the yellow foaming agent;
   0.1 part by weight of the white foaming agent;
   0.95 part by weight of the second internal lubricant; and
   0.8 part by weight of the second external lubricant.

7. The multi-layer foamed floorboard of claim 5, wherein
   the second calcium carbonate powder is 1250-mesh calcium carbonate; and/or
   the second foaming aid is acrylic copolymer (ACR).

8. The multi-layer foamed floorboard of claim 5, wherein the foaming regulator is an acrylic-based PVC processing aid with a molecular weight of 5,000,000-6,500,000 Dalton (Da).

9. The multi-layer foamed floorboard of claim 5, wherein raw materials of the foaming regulator comprise methacrylate, butyl acrylate, 4-fluoro-2-methyl-1-vinyl-benzene, an emulsifier and an initiator; a weight ratio of methacrylate to butyl acrylate is 1:1.5-3; and a weight ratio of methacrylate to 4-fluoro-2-methyl-1-vinyl-benzene is 1:0.1-0.3.

10. The multi-layer foamed floorboard of claim 1, wherein the multi-layer foamed floorboard has a structure of the surface layer—the core layer—the surface layer.

* * * * *